June 11, 1940.　　　S. M. NAMPA　　　2,203,965

WHEEL STRUCTURE

Filed June 24, 1936

INVENTOR
Sulo M. Nampa.
BY
Harness, Dickey, Pierce & Hann.
ATTORNEYS.

Patented June 11, 1940

2,203,965

UNITED STATES PATENT OFFICE 2,203,965

WHEEL STRUCTURE

Sulo M. Nampa, Detroit, Mich., assignor, by mesne assignments, to Transportation Systems, Inc., Oklahoma City, Okla., a corporation of Oklahoma Application June 24, 1936, Serial No. 86,926

7 Claims. (Cl. 295—11)

This invention relates to wheel structures and in particular relates to wheel structures having cushioned steel tires adapted to ride on rails.

Objects of the present invention are to provide in a wheel structure of the type having a steel tire, a resilient cushioning means between the tire and the hub to permit relative radial movement between the tire and hub and to absorb shocks therebetween; to provide a construction in which a maximum of radial movement of the hub within the tire is obtained with a minimum of lateral movement of the tire; to reduce the lateral movement of the steel tire of a rubber cushion steel wheel; to provide in a wheel construction having a steel tire and a rubber cushioning means between the tire and hub and separating them from each other, a means to take up the side thrust imparted to the tire; to provide a means to cool the tires and rubber positioned between the tire and hub when the wheel is rotating in engagement with a rail; and to provide a wheel structure which is economical to manufacture and relatively easy to assemble.

Other objects of the invention will become apparent from the following specification, the drawing relating thereto, and from the claims hereinafter set forth.

In the drawing, in which like numerals are used to designate like parts throughout the several views, Figure 1 is a partial side-elevation view, with parts broken away, of a wheel structure embodying features of the present invention;

Figure 1:
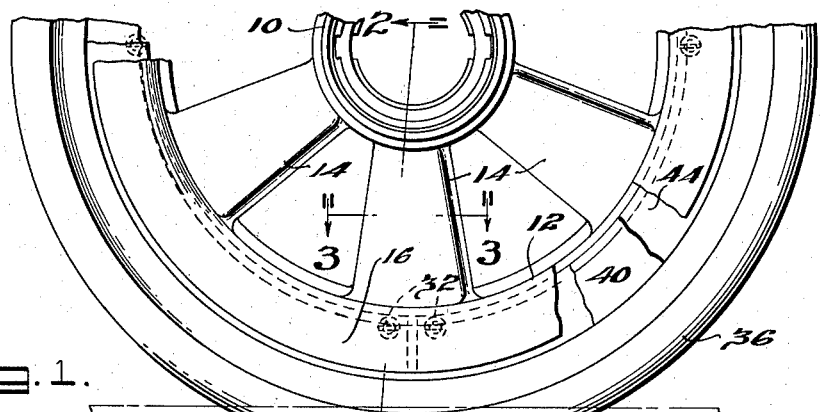

In vehicles with wheels having flanged steel tires adapted to ride on rails, it is desirable to provide a wheel construction in which a maximum of perpendicular movement of the hub within the tire is obtained in order to absorb the shock incident to the wheels striking the rails at the points of connection of the rails, as well as to reduce the transmission of the metallic, or other, sounds of the contact between the wheels and rails to the body and passengers therein.

While quiet and smooth operations are accomplished by the insertion of the rubber cushion ring between the steel tire and the rim, and while in such a construction, a maximum of perpendicular movement of the hub within the tire is obtained, a minimum of lateral movement of the tire relative to the rim is also desirable as in operation the side thrust of the rails against the flange of the tire will tend to displace the tire laterally relative to the rim. It is desirable to so construct the wheel that lateral movement of the tire is limited. The tendency for the steel tire to move laterally is greatest when the vehicle is traveling at a high rate of speed around a sharp curve, and it is important under such conditions that little or no movement of the tire laterally of the hub be permitted. If lateral movement of the tire relative to the hub is permitted, not only is the vehicle uncomfortable to passengers caused by the lateral swaying, but it is also dangerous because of the misalignment of the tire relative to the hub.

In the present invention, wheel structures are provided having rubber cushioning rings interposed between the rims of the hubs and the flanged steel tires in order to provide the maximum vertical movement which is desirable and means are also provided extending transversely of the rubber rings to limit the lateral movement of the tire. This transversely extending means may be either in the form of transverse flanges on the rim or tire projecting into the rubber ring, or in the form of incompressible elongated members which can be moulded into the ring at intervals therearound; and by the relation of the ring, with the eliminators moulded therein, with respect to the tire and rim substantially eliminate any lateral movement of the tire relative to the rim.

Although the present invention is particularly adaptable for use on vehicles of the type disclosed in the patent to Main No. 2,002,901, in which vehicles adapted to travel either on highways or rails are disclosed, it is also adapted for use on other types of railroad wheels, as well as double flanged wheels operating on a track where the matter of relationship of flange and vehicle is of importance.

In operation a great deal of heat is generated in the rubber ring itself due to the practically constant flexing or movement of the rubber which tends to deteriorate the rubber ring and reduce the life of the wheel. In order to reduce the effect of this heat on the rubber to a minimum, means are provided in the form of fan blades, which also serve as the connecting spokes between the hub and the rim, which, upon rotation of the wheel, will cause circulation of the air adjacent the tire, thereby cooling it and preventing the deterioration of the rubber ring. The life of the wheel is therefore materially increased.

Figure 3:
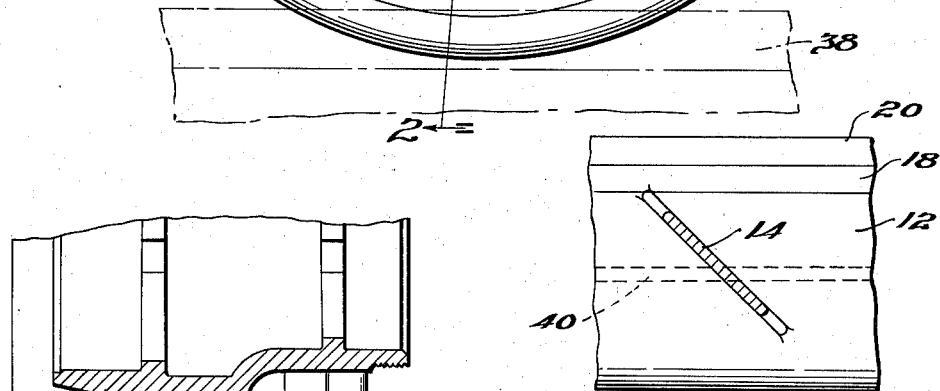
Fig. 3 is a plan view taken substantially along the line 3—3 of Fig. 1.
Figure 2:
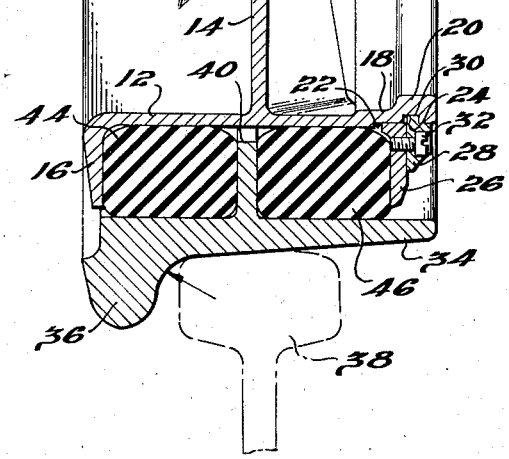
Fig. 2 is a cross-sectional view, taken substantially along the line 2—2 of Figure 1.

For a better understanding of the invention, reference may be had to the drawing, and in Figures 1 to 3 a wheel structure is shown having a hub portion 10 which may be either keyed to or rotatably mounted on an axle of the vehicle (not shown), depending on conditions involved, and an annular rim 12, the hub and rim being connected by spokes 14 which are formed integral therewith at spaced intervals around the hub and rim.

The rim 12 has a radially outwardly directed annular flange 16 at its inner edge and has radially inwardly offset annular portions 18 and 20 at its outer edge. The rim 12 is provided with an annular recess 22 adjacent the portion 18 and an annular groove 24 adjacent the portion 20. A continuous annular ring 26 fits within the recess 22 and is held in place by means of an annular split ring 28 which has an annular shoulder 30 at its inward edge adapted to engage the rim 12 within the channel 24. The rings 26 and 28 are held together by means of screws 32 at spaced intervals around the wheel, and also serve to prevent inadvertent expansion of the ring 28 from its desired operative position.

The wheel is provided with an annular steel tire 34 having a radially outwardly directed annular flange 36 at its inner edge, the tire riding upon the rail 38 and being maintained in lateral position thereon by means of the flange 36. The tire 34 has a radially inwardly directed annular flange 40 substantially at its transverse center.

The tire 34 is mounted in surrounding relation to the rim 12 but is separated therefrom by rubber cushioning rings 44 and 46, which are interposed between the rim and the tire. The rubber rings are of such thickness compared with the length of the flanges 16 and 40 that vertical movement of the hub relative to the tire is permitted without contact between the portions of the tire. The rubber rings 44 and 46 are separated from each other by means of the flange 40 and are held against lateral displacement by means of the flange 16 and the ring or flange 26. By having a plurality of rubber rings, rather than a single ring, extending transversely of the width of the rim 12, and by having the flange 40 separating the plurality of rubber rings, lateral displacement or movement of the tire is reduced when it is subjected to the side thrust in the direction indicated by the arrow in Figure 2. The side thrust will be absorbed by the rubber ring 44 and will be limited to the extent of compressibility of this ring 44, which is of course materially less than would be the case if a single rubber ring, extending the entire width of the rim, were used. It is evident that this structure reduces the lateral movement of the tire relative to the rim without affecting the vertical movement of the hub relative to the tire.

As heat is developed by the flexing of the rubber the spokes 14 are constructed in plate-like form and are skewed relative to the axis of the hub, so that when the wheel is rotating, the spokes 14 function as fan blades, causing a circulation of air in the vicinity of the tire and rubber rings, thereby keeping the rubber rings relatively cool, lengthening the life of the wheel.

The wheel structure shown in Figures 1 and 2 is assembled by first placing the rubber ring 44 over the rim 12 into engagement with the flange 16, then placing the tire 34 in surrounding relation to the rim 12 from the outer side, so that the flange 40 engages the rubber ring 44, then placing the rubber ring 46 in surrounding relation to the rim 12 within the tire 34 and engaging the flange 40, then placing the annular ring 26 in surrounding relation to the rim 12 and securing it in place on the rim by inserting the annular rim 28 in surrounding relation to the rim 12 and securing the ring 26 and the rim 28 together by means of the screws 32.

Figure 4:
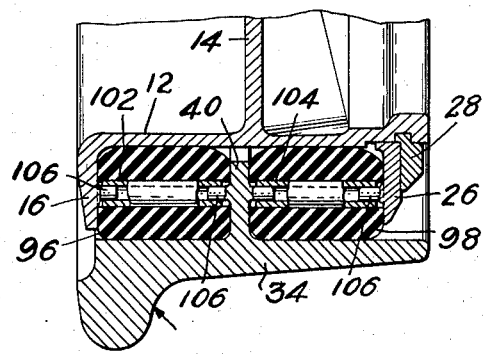
Fig. 4 is a cross-sectional view of a modified form of wheel structure embodying features of the present invention.

A modification of the invention is shown in Figure 4, in which a plurality of rubber rings 96 and 98 are interposed between the rim 12 and the tire 34, the rim 12 being provided with the flange 16 and the tire 34 being provided with the flange 40, the parts being held in assembled position by means of the annular ring 26 and rim 28 similar to those shown and described in regard to Figure 2. In the modification of Fig. 4, the rubber rings 96 and 98 have moulded therein at spaced intervals therearound transversely extending metal bars, or tubes, 102 and 104, respectively. Any number of these metal bars may be used and, while they are tubular in structure, they may be of any desired shape.

Corresponding to the positions of these metal bars within the rubber tires, the flanges 16, 40 and 26 are provided with aligned bosses 106, which are adapted to fit within and slidably engage cooperating metal bars 102 and 104. The metal bars 102 and 104 are of such lengths that they are slightly below the surface of the sides of the rubber rings and they may be cut short of the distance between the flanges to limit the travel of the lateral movement of the tires to the amount desired.

The end thrust is in the direction of the arrow indicated in Figure 4 and it can be seen that it is not always necessary to use the metal pieces in the outer rubber ring 98 because the maximum thrusts are not in that direction but instead are in the direction of the arrow. There are thrusts in the opposite direction than that illustrated by the arrow, but these are infrequent so that under some circumstances, the outer bars 104 may be dispensed with. It of course follows that under such circumstances the bosses on the outer side of the flange 40 and on the ring 26 may also be dispensed with.

Formal changes may be made in the specific embodiments of the invention described without departing from the spirit and substance of the broad invention, the scope of which is commensurate with the appended claims.

What is claimed is:

1. In a wheel construction adapted to run on rails, a rim, a tire, and rubber cushioning means interposed between and separating said rim and tire, said rim having radially outwardly directed, axially inner and outer annular flanges at its edges, and axially outwardly projecting bosses on said inner flange at spaced intervals therearound, said tire having a radially outwardly directed annular flange at one edge and a radially inwardly directed flange substantially at its center extending into and transversely separating said means, said last named flange having bosses spaced on one side therearound extending toward and substantially in alignment with said first-named bosses, said rubber means having elongated tubular members transversely embedded therein engaging said bosses, said tubular members being more rigid than said rubber means, the construction and arrangement being such that transverse movement of said tire is substantially eliminated.

2. In a wheel construction adapted to run on rails, a rim, a tire, and rubber cushioning means interposed between and separating said rim and tire, said rim having radially outwardly directed, axially inner and outer annular flanges at its edges, and axially outwardly projecting bosses on said inner flange at spaced intervals therearound, said tire having a radially outwardly directed annular flange at one edge and a radially inwardly directed flange substantially at its center extending into and transversely separating said means, said last-named flange having bosses spaced on one side therearound extending toward and substantially in alignment with said first-named bosses, said rubber means having elongated tubular members transversely embedded therein slidably engaging said bosses, said tubular members being more rigid than said rubber means, the construction and arrangement being such that transverse movement of said tire is substantially eliminated.

3. In a wheel construction adapted to run on rails, a rim, a tire, and rubber cushioning means interposed between and separating said rim and tire, said rim having radially outwardly directed, axially inner and outer annular flanges at its edges and transversely projecting bosses on said flanges at spaced intervals therearound which project toward each other, said tire having a radially outwardly directed annular flange at one edge and a radially inwardly directed flange substantially at its center extending into and transversely separating said means, said last named flange having spaced bosses around its sides extending toward and in substantial alignment with said first-named bosses, said rubber means having elongated tubular members transversely embedded therein engaging said bosses, said tubular members being more rigid than said rubber means, the construction and arrangement being such that transverse movement of said tire is substantially eliminated.

4. In a wheel construction adapted to run on rails, a rim, a tire, and rubber rings interposed between and separating said rim and tire, said rim having radially outwardly directed, axially inner and outer annular flanges at its edges, and axially outwardly projecting bosses on said inner flange at spaced intervals therearound, said tire having a radially outwardly directed annular flange at one edge and a radially inwardly directed flange substantially at its center extending into engagement with and separating said rings, said last-named flange having bosses spaced at one side therearound extending toward and substantially in alignment with said first-named bosses, one of said rubber rings having elongated tubular members transversely embedded therein, terminating short of the sides of said ring, and slidably engaging said bosses, said tubular members being more rigid than said rubber rings.

5. In a wheel construction adapted to run on rails, a rim member, a tire member, and rubber cushioning means interposed between and separating said members, one of said members having radially directed, axially inner and outer annular flanges at its edges, and axially outwardly projecting bosses on said inner flange at spaced intervals therearound, the other member having a radially directed annular flange substantially at its center extending into and transversely separating said means, said last-named flange having bosses spaced on one side therearound extending toward and substantially in alignment with said first-named bosses, said rubber means having elongated tubular members transversely embedded therein engaging said bosses, said tubular members being more rigid than said rubber means, the construction and arrangement being such that transverse movement of said tire is substantially eliminated.

6. In a wheel construction adapted to run on rails, a rim member, a tire member, and rubber cushioning means interposed between and separating said members, one of said members having radially directed, axially inner and outer annular flanges at its edges, and axially outwardly projecting bosses on said inner flange at spaced intervals therearound, the other member having a radially directed annular flange substantially at its center extending into and transversely separating said means, said last-named flange having bosses spaced on one side therearound extending toward and substantially in alignment with said first-named bosses, said rubber means having elongated tubular members transversely embedded therein slidably engaging said bosses, said tubular members being more rigid than said rubber means, the construction and arrangement being such that transverse movement of said tire is substantially eliminated.

7. In a wheel construction adapted to run on rails, a rim member, a tire member having a radially outwardly directed annular flange at one edge, and rubber cushioning means interposed between and separating said members, one of said members having radially directed, axially inner and outer annular flanges at its edges, and transversely projecting bosses on said flanges at spaced intervals therearound which project toward each other, the other member having a radially inwardly directed flange substantially at its center extending into and transversely separating said means, said last-named flange having spaced bosses around its sides extending toward and in substantial alignment with said first-named bosses, said rubber means having elongated tubular members transversely embedded therein terminating short of the sides of said rubber means and slidably engaging said bosses, said tubular members being more rigid than said rubber means.

SULO M. NAMPA.